(12) United States Patent
Weinman

(10) Patent No.: US 7,003,524 B1
(45) Date of Patent: Feb. 21, 2006

(54) POLYMORPHIC DATABASE

(75) Inventor: William Edward Weinman, Dallas, TX (US)

(73) Assignee: Polymorphic Data Corporation, Dallas, TX (US)

( * ) Notice: Subject to any disclaimer, the term of this patent is extended or adjusted under 35 U.S.C. 154(b) by 462 days.

(21) Appl. No.: 10/098,705

(22) Filed: Mar. 14, 2002

Related U.S. Application Data

(60) Provisional application No. 60/275,609, filed on Mar. 14, 2001.

(51) Int. Cl.
*G06F 17/00* (2006.01)
*G06F 7/00* (2006.01)

(52) U.S. Cl. .................... 707/100; 707/104.1
(58) Field of Classification Search ...... 707/100–104.1
See application file for complete search history.

(56) References Cited

U.S. PATENT DOCUMENTS

| | | | | |
|---|---|---|---|---|
| 5,115,504 A | * | 5/1992 | Belove et al. ............. | 707/100 |
| 5,491,818 A | * | 2/1996 | Malatesta et al. .......... | 707/201 |
| 5,613,111 A | * | 3/1997 | Malatesta et al. ............. | 707/2 |
| 5,819,282 A | * | 10/1998 | Hooper et al. .......... | 707/103 R |
| 5,842,220 A | | 11/1998 | De Groot et al. ....... | 707/103 R |
| 5,845,270 A | | 12/1998 | Schatz et al. .................. | 706/11 |
| 5,991,776 A | * | 11/1999 | Bennett et al. ............. | 707/205 |
| 6,016,497 A | * | 1/2000 | Suver ...................... | 707/103 R |
| 6,032,151 A | * | 2/2000 | Arnold et al. .......... | 707/103 R |
| 6,356,913 B1 | * | 3/2002 | Chu et al. ............... | 707/103 R |
| 6,578,044 B1 | * | 6/2003 | Scheifler et al. .............. | 341/55 |
| 6,606,618 B1 | * | 8/2003 | Delo ............................. | 707/2 |
| 6,687,704 B1 | * | 2/2004 | Russell ....................... | 707/100 |
| 6,754,648 B1 | * | 6/2004 | Fittges et al. .................. | 707/1 |
| 2004/0117397 A1 | * | 6/2004 | Rappold, III ............... | 707/102 |

FOREIGN PATENT DOCUMENTS

WO   WO 99/13419 A1  *  3/1999

OTHER PUBLICATIONS

Sutherland, J., M. Pope and K. Rugg "The Hybrid Object-Relational Architecture (HORA)", Proceedings of the 1993 ACM/SIGAPP Symposium on Applied Computing: States of the Art and Practice, pp. 326-333, Mar. 1993.*

Sargent, R. et al. "The Design and Implementation of a Database for Human Genome Research", Proceedings of the $8^{th}$ International Conference on Scientific and Statistical Database Systems, pp. 220-225, Jun. 18-20, 1996.*

(Continued)

*Primary Examiner*—Luke S Wassum
(74) *Attorney, Agent, or Firm*—Jack D. Stone, Jr.

(57) ABSTRACT

A database contains an application program operative with data stored in a records data set (RDS) and a categories data set (CDS). The RDS contains an arbitrarily organized series of RDS entries, each having at least one data field configured for representing data. The CDS contains CDS entries configured for defining the schematic data types and data relationships of the RDS entries. Data is thus isolated from its definition, thereby permitting the underlying schematic form of the database to be changed based on modifications in the CDS, without requiring any actual changes to the schematic structure of the RDS or the underlying database. By virtue of this same isolation, it is also possible to reduce data redundancy with varying levels of granularity and create an object-oriented data model.

14 Claims, 4 Drawing Sheets

OTHER PUBLICATIONS

Matthes, F., R. Muller and J.W. Schmidt "Towards a Unified Model of Untyped Object Stores", Proceedings of the 3rd International Workshop of the Moscow ACM SIGMOD Chapter: Advances in Database and Information Systems (ADBIS '96).*

Marriott, S. "Music Trivia and All That Jazz", Irish Times, p. 13, Jun. 22, 2001.*

Keim, Daniel A., Kriegel, Hans-Peter, Miethsam, Andreas, *Intetration of Relational Databases in a Multidatabase System Based on Schema Enrichment,* Feb. 1993, pp. 96-104.

Markowitz, Victor M., Shoshani, Arie, *Object Queries Over Relational Databases: Language, Implementation, and Applications,* Lawrence Berkeley Laboratory Technical Report LBL-32019.

* cited by examiner

POLYMORPHIC DATABASE

CLAIM OF PRIORITY

This application claims priority from U.S. Provisional Patent Application No. 60/275,609 entitled "POLYMORPHIC DATABASE" filed on behalf of William Edward Weinman, on Mar. 14, 2001.

COMPACT-DISC APPENDIX

Two (2) identical Compact Disc-Recordables (CD-Rs, Copy 1 and Copy 2), containing a computer program listing, constitute a part of the specification of this invention pursuant to 37 C.F.R. 1.77 and 1.96, and is incorporated by reference herein for all purposes. The application is written in Perl using MySQL as a database engine. All accompanying files needed to make the application work are on the CD-Rs. Pursuant to CFR §1.96(c) (2) (iii) the line terminators are in ASCII Carriage-Return/Line-Feed format. The application is designed to run in a Unix environment, which uses line terminators formatted as ASCII Line-Feed only. Also included on the CD-Rs is a Unix "tar" archive file (webmusicdb2002010400.tar), which contains all of the original files in their native Unix format. The actual size of the files is 1,786,704 bytes, and the actual size of the files on the CD-R is 2,512,896 bytes.

TECHNICAL FIELD

The invention relates generally to databases and, more particularly, to the underlying schematic structure of databases.

BACKGROUND

Large databases running in publicly accessible environments are notorious for their inability to accommodate change. In today's world of massive access to large databases via the Internet, it is increasingly common to encounter messages to the effect of "database is down for maintenance" instead of the actual data requested.

In a conventional database environment, when a change needs to be made to the schematic structure of a database, the data in the database must be extracted from the database in the old structure and re-written to the database in the new structure. If new data were to be inserted into the database while said changes were being effected, it could cause unpredictable effects to the database. Such effects could include corruption of pre-existing data, misapplication of database changes, misalignment of data relative to internal data boundaries, or any number of problems that could render the database effectively incoherent. Such results are untenable in most live database deployments.

Conventionally, the most common solution to the problem of updating during changes to the schematic structure is to simply disallow it.

Conventional databases also require a tight bind between the data type and the data storage. Users require that the data they request be presented in a manner consistent with the expected usage of the data. For example, a date may be stored in the database as a string of decimal digits (e.g., 20010303), but to present the data to the user in its raw form would be unacceptable. A conventional computer user requires that it be presented in a manner consistent with its usage (e.g., Saturday, 3, Mar. 2001. In order for the date to be presented in a manner consistent with its usage, the database must carry type-related information along with each unit of data.

Binding between data and type is conventionally accomplished by organizing the data into metaphorical rows and columns. Rows of data are divided into pre-defined columns, where each column represents a particular data type and/or use of the data. Such data/type binding allows a computer program to make assumptions and inferences about the data appropriate to its type. Additional rows of data may be readily added to a database. However, if a new column is desired in a database, then the database must typically be made unavailable for a period of time so that data can be converted into the new format. Modifications to pre-existing programs would have to be made, along with the requisite testing and debugging necessary to validate any new code.

It is also worth noting that in conventional databases there tends to be redundancy in the storage of data. For example, cities, states, zip codes, and telephone area codes may be repeated among a number of rows of data. Such redundancy results in inefficient use of memory.

In light of the foregoing, it is apparent that there is a need for a system and method for modifying the schematic structure of a database without making the database unavailable for the entry of new data. Preferably, such a system and method would, among other things, also minimize redundancy of data in a database.

SUMMARY

The present invention, accordingly, provides a database in which an application program accesses data stored in a records data set (RDS) and a categories data set (CDS). The RDS contains at least one RDS entry having a data field configured for representing data. The CDS contains at least one CDS entry configured for being associated with at least one RDS entry and having at least one data type field sufficient to describe the type of data contained by the at least one associated RDS entry.

The invention thus provides a database whereby data is isolated from its definition, thus avoiding the problems associated with the rows-and-columns model enumerated above, and permits the underlying schematic form of the database to be changed based on modifications to the CDS, without requiring any actual changes to the schematic structure of the RDS or the underlying database. By virtue of this same isolation it is also possible to reduce data redundancy with varying levels of granularity and create an object-oriented data model.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
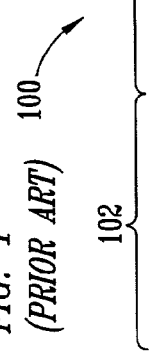
FIG. 1 is a schematic diagram of a prior-art name-and-address database table with a small set of records.

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning databases and the like have been omitted inasmuch as such details are not considered necessary to obtain a complete understanding of the present invention, and are considered to be within the skills of persons of ordinary skill in the relevant art.

It is noted that, unless indicated otherwise, all functions described herein are performed by a processor such as a computer or electronic data processor in accordance with code such as computer program code, software, integrated circuits, and/or the like that are coded to perform such functions. Furthermore, it is considered that the design, development, and implementation details of all such code would be apparent to a person having ordinary skill in the art based upon a review of the present description of the invention.

Reference is now made to the drawings wherein like or similar elements are designated by the same reference numeral through the several views.

Referring to FIG. 1 of the drawings, the reference numeral 100 generally designates a database schema for a database embodying features of the prior art. The system 100 is exemplified, for purposes of illustration only, as a simple conventional rows-and-columns database having six columns, or fields, 102, 104, 106, 108, 110, and 112, and three rows, or records, 121, 122, and 123 of name-and-address data. It is understood that the database 100 may be configured to handle virtually any type or quantity of data desired, limited only by computer memory.

The first field 102 is configured for storing a person's name. The second field 104 is configured for storing a street address associated with a person identified by name in a respective field 102. The third field 106 is configured for storing a city associated with the person identified by name in a respective field 102. The fourth field 108 is configured for storing a state associated with the person identified by name in a respective field 102. The fifth field 110 is configured for storing a zip code associated with the person identified by name in a respective field 102. The sixth field 112 is configured for storing a telephone number associated with the person identified by name in a respective field 102.

Each field 102, 104, 106, 108, 110, and 112 may be restricted to store only certain types of data to thereby make more efficient and reliable use of the database. For example, by knowing that any data found in the fourth column represents a two-letter state abbreviation (104), a programmer could decide to restrict data entry in that column to two uppercase alpha letters, even validating such entry against a list of allowable values. Likewise, knowing that the fifth column 110 is configured for a U.S. zip code, entry of text in that column could be restricted to five numeric characters. Data in the sixth column 112, could be configured for storing a 10-digit telephone number without the punctuation, but for displaying the data with predefined punctuation.

Figure 2:
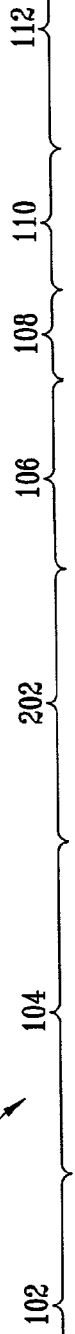
FIG. 2 is a schematic diagram of the prior-art database table of FIG. 1, after modifying the database to include a second line for an address.

If the users of the database depicted by FIG. 1 would desire a second line of space for an address, the database schema would be modified. FIG. 2 represents the database schema of FIG. 1, after such a modification. The modification process would normally require that the database be made unavailable for a period of time so that the data can be converted into the new format. Modifications to pre-existing programs would then be made, along with requisite testing and debugging necessary to validate any new code.

It is noted that there is redundancy in the data entered into the databases 100 and 200. For example, all of the rows 121, 122, and 123 in the city field 106, the state field 108, and the zip code field 110 are repeated. Additionally, subsets of the data in the address field 104 and in the phone number fields 112 are redundant; that is, each record identifies the same street, and has the same telephone area code, which constitutes an inefficient use of computer memory.

Figure 3:
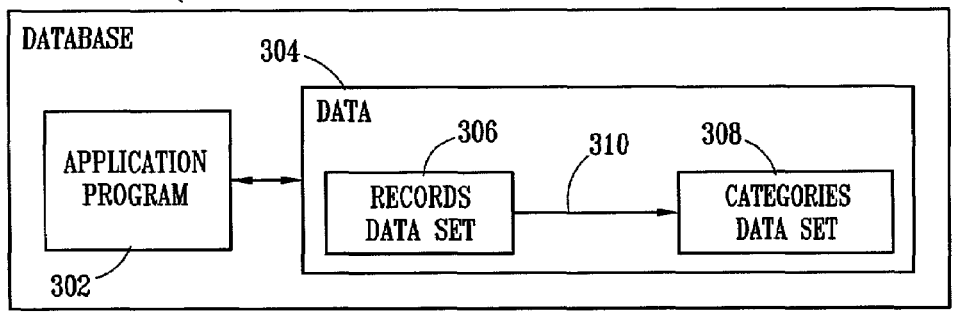
FIG. 3 is high-level schematic diagram depicting the architecture of a database embodying features of the present invention.

In FIG. 3, an embodiment of a database 300 configured in accordance with the present invention is shown which permits the schema of the database 100 to be modified while data is being entered into it, and which permits redundancy of data storage to be minimized. The database 300 preferably comprises an application program 302 and data 304, and may be built on top of a traditional (rows-and-columns) database or, preferably, as the basis of a new database engine. The data 304 preferably comprises two data sets, namely, a records data set (RDS) 306 and a categories data set (CDS) 308 linked to the RDS 306 via a link 310, as described in further detail below. As will be appreciated, data is thus organized using an ad-hoc linked list, which does not itself impose any hierarchy on the data involved. As will be described further below, the RDS 306 comprises data associated with the database 300, along with structural information that allows each item of data to be associated with an item in the CDS 308, and to indicate association with peer data. The CDS 308 also comprises structural information and, additionally, includes pointers and flags that define each category's relationship with other categories, and associated RDS entries. Pointers in the RDS 306 are used to indicate peer relationships, but those peer relationships are governed by definitions in the categories set, and the implementation of those definitions in the code defining the database.

Figure 4:
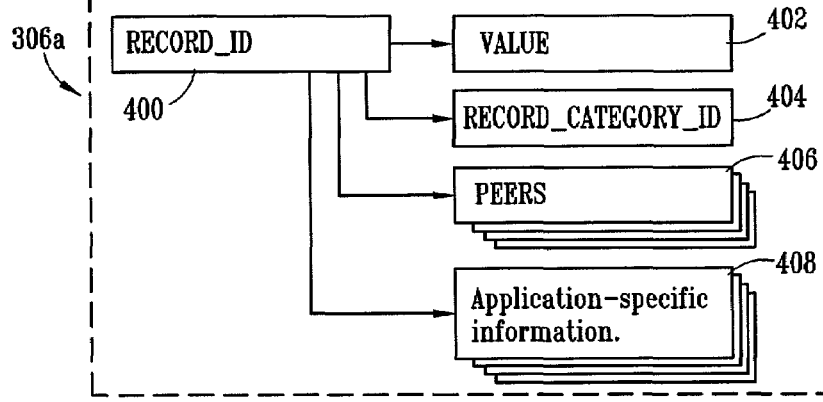
FIG. 4 is a schematic diagram depicting fields that may be used to implement an RDS of a preferred embodiment of the invention.

As depicted in FIG. 4, and as described in further detail below, the RDS 306 comprises one or more RDS entries 306a, each of which entries preferably comprise five fields, namely, a RECORD_ID field (also referred to as a unique record identifier) 400, a VALUE field 402, a RECORD_CATEGORY_ID field 404, a PEERS field 406, and an APPLICATION-SPECIFIC INFORMATION field 408. The fields 400, 402, 404, 406, and 408 are preferably related to each other via pointers, well known in the art, but may also be related via any of a number of different well known techniques, such as by rows and columns of a conventional database, and the like.

The RECORDS_ID field 400 is preferably a unique identifier, and may comprise a suitable pointer to the respective RDS entry 306a with which the RECORDS_ID field 400 is associated. The contents of the RECORDS_ID field 400 of each RDS entry 306a is configured for use in the PEERS field 406 (described below). The VALUE field 402 is configured for storing the value entered by a user into a respective RDS entry 306a. The RECORD_CATEGO- RY_ID field 404 is configured for binding the respective RDS entry 306a to a category, discussed below. The PEERS field 406 is configured for storing one or more other RDS entries 306a with which a respective RDS entry 306a is associated. The APPLICATION_SPECIFIC_INFORMATION field 408 is an optional field which, if used, may include information, such as date/time stamps, creator identifications, and the like.

Figure 5:
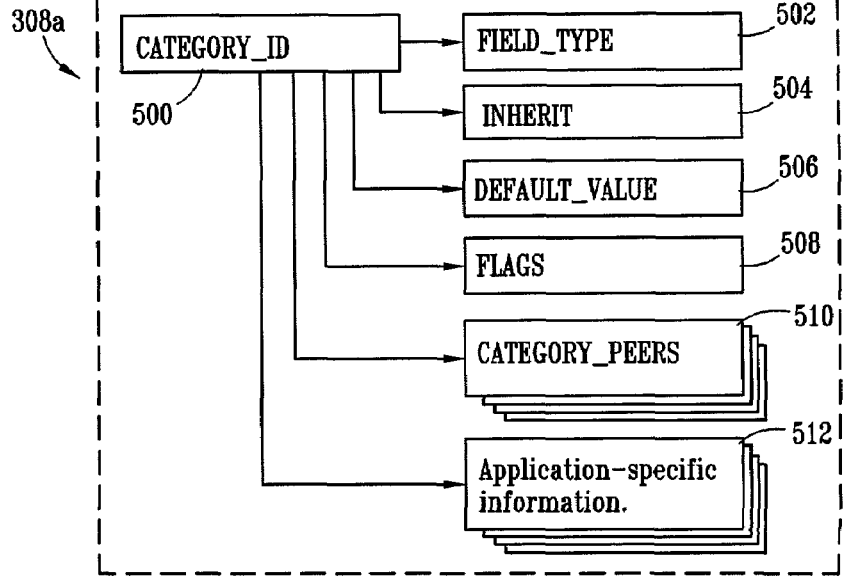
FIG. 5 is a schematic diagram depicting fields that may be used to implement a CDS of a preferred embodiment of the invention.

As depicted in FIG. 5, and as described in further detail below, the CDS 308 comprises one or more CDS entries 308a, each of which entries preferably comprises seven fields, namely, a CATEGORY_ID field (also referred to as a unique category identifier) 500, a FIELD_TYPE field 502, an INHERIT field 504, a DEFAULT_VALUE field 506, a FLAGS field 508, a CATEGORY_PEERS field 510, and an APPLICATION-SPECIFIC INFORMATION field 512. The fields 500, 502, 504, 506, 508, 510, and 512 are preferably related to each other via pointers, well known in the art, but may also be related via any of a number of different well known techniques, such as rows and columns of a conventional database, and the like. The CDS entry 308a may optionally be configured without the INHERIT field 504, the DEFAULT_VALUE field 506, and/or the APPLICATION-SPECIFIC INFORMATION field 512.

The CATEGORY_ID field 500 is a field configured for storing a numeric or mnemonic identifier which uniquely identifies the respective CDS entry 308a with which a CATEGORY_ID field 500 is associated. The FIELD_TYPE field 502 is a field configured for identifying the type of data to be stored in a respective category. By way of example, the data type may be text, integer, data, and the like. The INHERIT field 504 is configured for storing one or more CATEGORY_IDs for one or more other categories from which a respective category inherits data type properties. The DEFAULT_VALUE field 506 is configured for storing a default value 402 for new RDS entries 306a entered into the database 300. The DEFAULT_VALUE field 506 may comprise a single value or a plurality of values, such as a list of values from which a user may choose. The FLAGS field 508 is configured for storing one or more flags for use by the database application program 302. By way of example, flags may include a "standalone" flag to indicate categories that can stand without a peer; a "sequential" flag to indicate an ordered list; a "blank_okay" flag to indicate that blank values in an RDS entry 306a are allowed; a "reusable" flag to indicate that an existing RDS entry 306a may be reused instead of creating a new RDS entry 306a where the value and meaning of the existing RDS entry 306a is substantively identical to the new RDS entry 306a that would otherwise have been created; and a "single" flag to indicate that multiple peers of a respective category are not allowed; and the like. The CATEGORY_PEERS field 510 is configured for storing one or more CATEGORY_ID values 500 of other CDS entries 308a related to a respective CDS entry 308a. The APPLICATION-SPECIFIC INFORMATION field 414 is configured for storing additional information, such as, the title, description, mask, help strings, and the like, associated with a respective CDS entry 308a.

Figure 6:
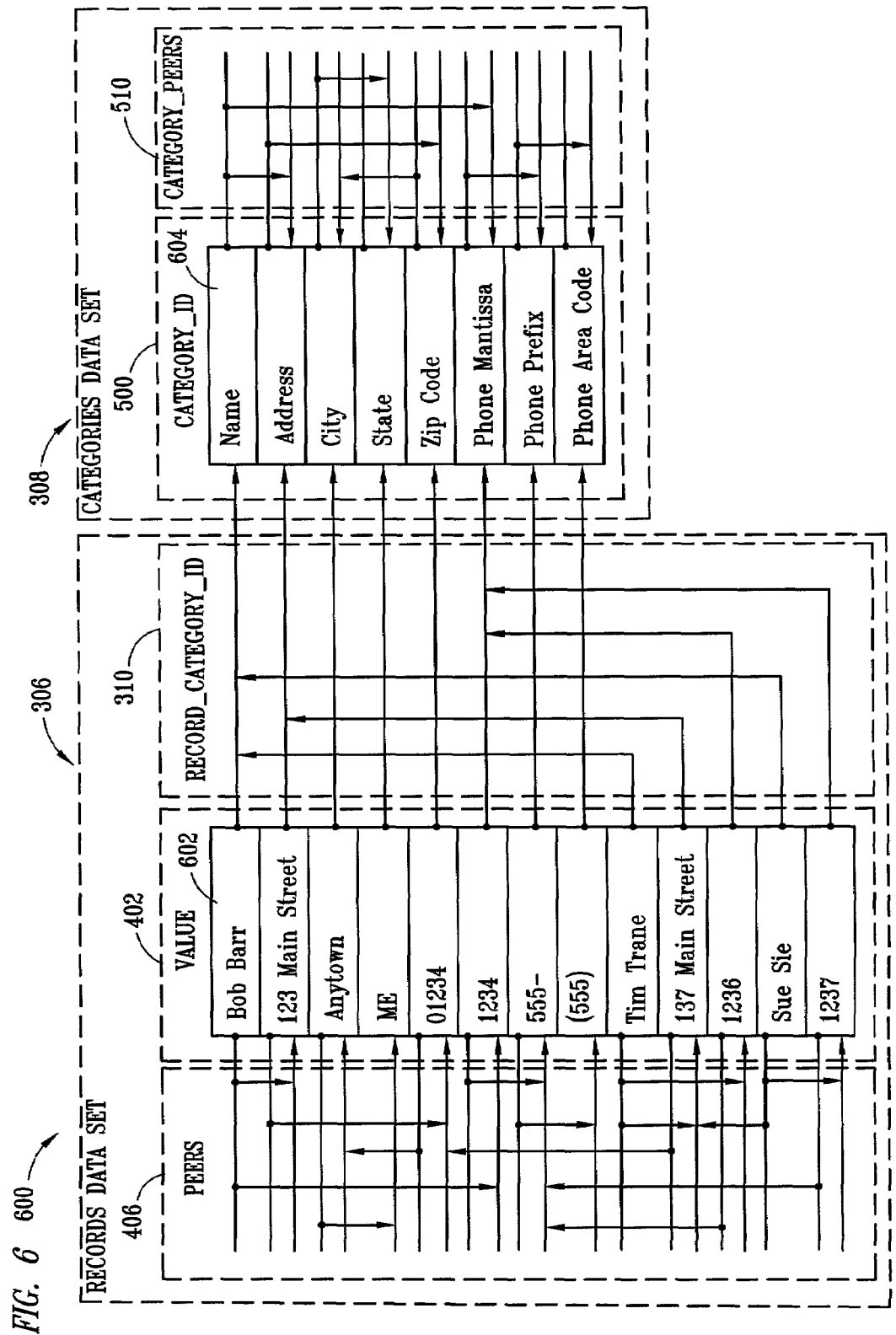
FIG. 6 is a schematic diagram of a preferred embodiment of the invention implementing the database from FIG. 1.

FIG. 6 exemplifies how the data contained in the conventional database table 100 of FIG. 1 may be implemented in accordance with principles of the present invention. With respect to the RDS 306, the VALUE field 402 of RDS entries 306a of respective RDS entries 306a are populated with values, generally entered by a user, as shown in FIG. 6. RDS entries 306a are preferably related to other RDS entries 306a as "peers" by entry of the RECORD_ID 400 of related RDS entries 306a into the PEERS field 406 of a respective RDS entries 306a. The "peers" designation implies lack of hierarchy, and the links between RDS entries 306a are preferably bi-directional many-to-many pointers, but alternatively may be unidirectional, bi-directional, one-to-many, many-to-one, many-to-many pointers, or the like. The RECORD_CATEGORY_ID field 404 of RDS entries 306a is discussed below, and the optional APPLICATION_SPECIFIC_FIELD 408 is not depicted in FIG. 6. By way of example, if the RDS entries 306a have RECORD_IDs 400 corresponding to their sequential order from top to bottom as viewed in FIG. 6 (though no sequence is required with the present invention), the first RDS entry 306a, designated in FIG. 6 by the reference numeral 602, would have the following data stored in the respectively identified fields:
    RECORD_ID=1
    VALUE="Bob Barr"
    RECORD_CATEGORY ID=name
    PEERS=2, 6

With respect to the categories data set 308, the CATEGORY_ID fields 500 of respective CDS entries 308a are populated with values, such as name, address, city, state, zip code, phone mantissa, phone prefix, phone area code, and the like. It is understood, too, that the CATEGORY_ID fields 500 may be populated with the equivalent of the field names of any number of conventional tables, thereby rendering moot the need for additional conventional data tables. CDS entries 306a are preferably related to other CDS entries 306a as "peers" by entry of the CATEGORY_ID 500 of related CDS entries 306a into the CATEGORY_PEERS field 510 of a respective CDS entries 308a. The "peers" designation implies lack of hierarchy, and the links between CDS entries 308a are preferably unidirectional one-to-many pointers, but alternatively may be unidirectional, bi-directional, one-to-many many-to-one, many-to-many pointers, or the like. The optional INHERIT field 504, DEFAULT_VALUE field 506, and APPLICATION_SPECIFIC_INFORMATION field 512 is not depicted in FIG. 6. By way of example, if the CDS entries 306a have CATEGORY_IDs 500 corresponding to their sequential order from top to bottom as viewed in FIG. 6 (though no sequence is required with the present invention), the first RDS entry 306a, designated in FIG. 6 by the reference numeral 604, would have the following data stored in the respectively identified fields:
    CATEGORY_ID=name
    FIELD_TYPE=text
    FLAGS=standalone
    CATEGORY_PEERS=address, apartment, phone_mantissa It can be appreciated that the peer relationships may be created from the finest granularity to the greatest granularity. Hence, the name CATEGORY_ID is related to the phone mantissa, which in turn is related to the phone prefix, which in turn is related to the phone area code. Thus, the phone area code and phone prefix of the phone numbers of all similarly situated RDS entries need be carried only once, thereby minimizing data redundancy.

It is noted that a "stand-alone" flag, which may be stored in the FLAGS field 508 of a respective CDR entry 308a, may be used to indicate whether PEER field must be available in a first RDS entry 406 for storing the RECORD_ID of a second RDS entry before the second RDS entry is entered into the RDS 308.

Figure 7:
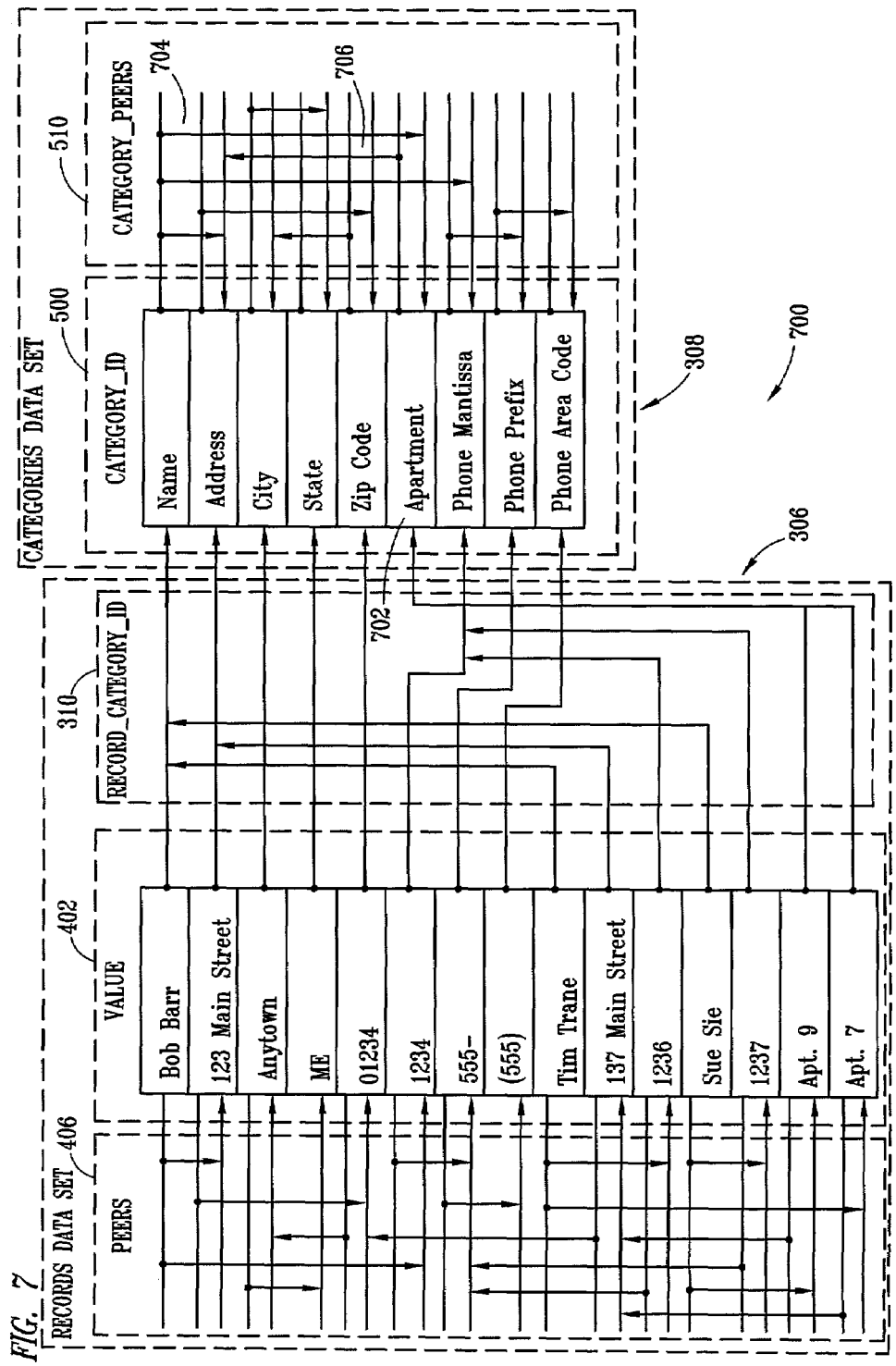
FIG. 7 is a schematic diagram of a preferred embodiment of the invention implementing the database from FIG. 2.

FIG. 7 illustrates the addition of an APARTMENT field to the CDR 500, similar to the addition of the address line 2 field in table 200 (FIG. 2), and the addition of the new PEER relationships 704 and 706. It can be appreciated that the APARTMENT field 702 is may be added to database 300 without requiring any actual changes to the schematic structure of the RDS or the underlying database 300.

By use of the present invention, data in a database is isolated from its definition, thus avoiding the problems associated with the rows-and-columns model, and permitting the underlying schematic form of the database to be changed based on modifications to the CDS, without requiring any actual changes to the schematic structure of the RDS or the underlying database. Thus, arbitrary data interrelationships may be created independent of any innate relational or hierarchical structure of the underlying database technology. As a result, such data interrelationships may be created while a user is entering data into the database. Thus, the development time necessary to implement structural modifications, such as the modifications of FIG. 6 to FIG. 7, is significantly simpler than corresponding processes required with traditional rows-and-columns database models. For example, a new CDS entry 308a (e.g., the apartment CDS entry 702) may be defined, along with its relationships (e.g., 704 and 706) to previously defined CDS entries 308a, and such definition is entered in the CDS (e.g., 308). Because the CDS entries 308a are records in the CDS 308, no structural changes are necessary to any of the underlying database schema, even if the underlying technology is a rows-and-columns database. Because the CDS 308 is isolated from the RDS 306, there is no danger of corruption to the RDS 306 as a result of changes to the CDS 308. By virtue of this same isolation, it is also possible to reduce data redundancy with varying levels of granularity and create an object-oriented data model.

It is understood that the present invention may take many forms and embodiments. Accordingly, several variations may be made in the foregoing without departing from the spirit or the scope of the invention. For example, an RDS and a CDS may be combined into a single logical entity. Alternatively, the RDS and/or the CDS may be distributed over multiple separate or disparate data sets. The RDS and/or CDS may be implemented on top of other technologies, such as other database engines, file systems, application environments, and the like. The RDS and/or CDS may be maintained in random-access memory or stored on a fixed or read-only medium. The invention may be implemented as a native-format database engine.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A polymorphic database comprising:
 an application program; and
 data accessible by the application program and on which the application program is operative, wherein the data comprises:
  a records data set (RDS) containing at least two RDS entries, each of said at least two RDS entries comprising data fields configured for representing data, a unique record identifier, and a field configured for storing the unique record identifier of each other RDS entry with which each respective RDS entry is associated; and
  a categories data set (CDS) containing at least one CDS entry configured for being associated with the at least one RDS entry and having at least one data type field sufficient to describe the type of data contained by the at least one associated RDS entry.

2. The database of claim 1 further comprising for each CDS entry a unique category identifier, and for each RDS entry a field for storing the unique category identifier of the CDS entry with which a respective RDS entry is associated.

3. The database of claim 1 further comprising for each CDS entry a unique category identifier and an inheritance field configured for storing the unique category identifier corresponding to another CDS entry from which properties will be inherited for a respective CDS entry.

4. The database of claim 1 further comprising for each CDS entry a unique category identifier and an inheritance field configured for storing the unique category identifier corresponding to another CDS entry from which properties will be cumulatively inherited for a respective CDS entry.

5. The database of claim 1 further comprising:
 for each CDS entry a unique category identifier;
 for each CDS entry a field configured for storing the unique category identifier of each other CDS entry with which each respective CDS entry is associated; and
 for each RDS entry a RECORD_CATEGORY_ID field configured for storing the unique category identifier corresponding to the RDS entry, and a PEERS field for storing the unique record identifier of each other RDS entry which corresponds to each respective CDS entry associated with the unique category identifier stored in the RECORD_CATEGORY_ID field.

6. The database of claim 1 further comprising:
 for each CDS entry a unique category identifier;
 for each CDS entry a field configured for storing the unique category identifier of each other CDS entry with which each respective CDS entry is associated;
 for each RDS entry a RECORD_CATEGORY_ID field configured for storing the unique category identifier corresponding to the RDS entry, and a PEERS field for storing the unique record identifier of each other RDS entry which corresponds to each respective CDS entry associated with the unique category identifier stored in the RECORD_CATEGORY_ID field; and
 for each CDS entry a field configured for storing a STAND-ALONE flag indicating whether a PEER field must be available in a first RDS entry to store the unique record identifier of a second RDS entry before said second RDS entry may be entered into the RDS.

7. The database of claim 1 further comprising
 for each CDS entry a unique category identifier;
 for each CDS entry a field configured for storing the unique category identifier of each other CDS entry with which each respective CDS entry is associated;
 for each RDS entry a RECORD_CATEGORY_ID field configured for storing the unique category identifier corresponding to the RDS entry, and a PEERS field for storing the unique record identifier of each other RDS entry which corresponds to each respective CDS entry associated with the unique category identifier stored in the RECORD_CATEGORY_ID field; and
 for each CDS entry a field configured for storing a REUSABLE flag indicating whether a new other RDS entry should be created and referenced in the PEERS field, or an existing other RDS entry may be referenced in the PEERS field if the value and meaning of the existing other RDS entry is substantively identical to the value of the new other RDS entry that would otherwise have been created.

8. A method for defining data/type associations, the method comprising the steps of:

defining an application program; and defining data accessible by the application program and on which the application program is operative, wherein the data comprises:

a records data set (RDS) containing at least two RDS entries, each of said at least two RDS entries comprising data fields configured for representing data, a unique record identifier, and a field configured for storing the unique record identifier of each other RDS entry with which each respective RDS entry is associated; and a categories data set (CDS) containing at least one CDS entry configured for being associated with the at least one RDS entry and having at least one data type field sufficient to describe the type of data contained by the at least one associated RDS entry.

9. The method of claim 8 further comprising the steps of defining for each CDS entry a unique category identifier, and defining for each RDS entry a field for storing the unique category identifier of the CDS entry with which a respective RDS entry is associated.

10. The method of claim 8 further comprising the step of defining for each CDS entry a unique category identifier and an inheritance field configured for storing the unique category identifier corresponding to another CDS entry from which properties will be inherited for a respective CDS entry.

11. The method of claim 8 further comprising the step of defining for each CDS entry a unique category identifier and an inheritance field configured for storing the unique category identifier corresponding to another CDS entry from which properties will be cumulatively inherited for a respective CDS entry.

12. The method of claim 8 further comprising the steps of:
defining for each CDS entry a unique category identifier;
defining for each CDS entry a field configured for storing the unique category identifier of each other CDS entry with which each respective CDS entry is associated; and
defining for each RDS entry a RECORD_CATEGORY_ID field configured for storing the unique category identifier corresponding to the RDS entry, and a PEERS field for storing the unique record identifier of each other RDS entry which corresponds to each respective CDS entry associated with the unique category identifier stored in the RECORD_CATEGORY_ID field.

13. The method of claim 8 further comprising the steps of:
defining for each CDS entry a unique category identifier;
defining for each CDS entry a field configured for storing the unique category identifier of each other CDS entry with which each respective CDS entry is associated;
defining for each RDS entry a RECORD_CATEGORY_ID field configured for storing the unique category identifier corresponding to the RDS entry, and a PEERS field for storing the unique record identifier of each other RDS entry which corresponds to each respective CDS entry associated with the unique category identifier stored in the RECORD_CATEGORY_ID field; and
defining for each CDS entry a field configured for storing a STAND-ALONE flag indicating whether a PEER field must be available in a first RDS entry to store the unique record identifier of a second RDS entry before said second RDS entry may be entered into the RDS.

14. The method of claim 8 further comprising
defining for each CDS entry a unique category identifier;
defining for each CDS entry a field configured for storing the unique category identifier of each other CDS entry with which each respective CDS entry is associated;
defining for each RDS entry a RECORD_CATEGORY_ID field configured for storing the unique category identifier corresponding to the RDS entry, and a PEERS field for storing the unique record identifier of each other RDS entry which corresponds to each respective CDS entry associated with the unique category identifier stored in the RECORD_CATEGORY_ID field; and
defining for each CDS entry a field configured for storing a REUSABLE flag indicating whether a new other RDS entry should be created and referenced in the PEERS field, or an existing other RDS entry may be referenced in the PEERS field if the value and meaning of the existing other RDS entry is substantively identical to the value of the new other RDS entry that would otherwise have been created.

* * * * *